(12) United States Patent
Pentscher-Stani

(10) Patent No.: US 12,476,559 B2
(45) Date of Patent: Nov. 18, 2025

(54) MECHANICAL REINFORCING ELEMENT WITH TWO END REGIONS AND TWO ANGULAR REGIONS

(71) Applicant: TDK Electronics AG, Munich (DE)

(72) Inventor: Andreas Pentscher-Stani, Leibnitz (AT)

(73) Assignee: TDK Electronics AG, Munich (DE)

( * ) Notice: Subject to any disclaimer, the term of this patent is extended or adjusted under 35 U.S.C. 154(b) by 879 days.

(21) Appl. No.: 17/626,376

(22) PCT Filed: Jul. 31, 2020

(86) PCT No.: PCT/EP2020/071690
§ 371 (c)(1),
(2) Date: Jan. 11, 2022

(87) PCT Pub. No.: WO2021/019083
PCT Pub. Date: Feb. 4, 2021

(65) Prior Publication Data
US 2022/0255468 A1  Aug. 11, 2022

(30) Foreign Application Priority Data

Jul. 31, 2019  (DE) .......................... 102019120720.7

(51) Int. Cl.
*H02N 2/04* (2006.01)
*G06F 3/01* (2006.01)
*H10N 30/20* (2023.01)

(52) U.S. Cl.
CPC ............. *H02N 2/043* (2013.01); *G06F 3/016* (2013.01); *H10N 30/20* (2023.02)

(58) Field of Classification Search
CPC ........ H02N 2/043; H10N 30/20; H10N 30/00; G06F 3/016
See application file for complete search history.

(56) References Cited

U.S. PATENT DOCUMENTS

| | | | |
|---|---|---|---|
| 5,729,077 | A | 3/1998 | Newnham et al. |
| 6,465,936 | B1 * | 10/2002 | Knowles ................ H02N 2/043 310/328 |
| 8,951,660 | B2 | 2/2015 | Choo et al. |
| 9,472,746 | B2 | 10/2016 | Park et al. |

(Continued)

FOREIGN PATENT DOCUMENTS

| | | |
|---|---|---|
| CN | 1586828 A | 3/2005 |
| CN | 102754239 A | 10/2012 |

(Continued)

*Primary Examiner* — Emily P Pham
(74) *Attorney, Agent, or Firm* — Slater Matsil, LLP

(57) ABSTRACT

In an embodiment a mechanical reinforcing element includes two end regions, two angular regions, wherein the end regions are located at two opposite end faces of the reinforcing element, wherein each angular region connects to one of the end regions via a first joint, and wherein the angular regions have a stiffening structure, and a connecting portion interconnecting the two angular regions and connecting to the angular regions through second joints, wherein the mechanical reinforcing element is configured such that, upon a relative movement of the end regions with respect to each other, the connecting portion performs a movement perpendicular thereto.

18 Claims, 7 Drawing Sheets

(56) References Cited

U.S. PATENT DOCUMENTS

| | | | |
|---|---|---|---|
| 11,073,913 B2 | 7/2021 | Rinner et al. | |
| 2005/0224219 A1* | 10/2005 | Reier | F28D 1/05366 |
| | | | 165/149 |
| 2009/0303839 A1* | 12/2009 | Narayanan | H04R 17/00 |
| | | | 367/164 |
| 2018/0252939 A1* | 9/2018 | Artusi | G02C 5/2272 |
| 2019/0196597 A1* | 6/2019 | Rinner | H02N 2/043 |
| 2019/0198271 A1 | 6/2019 | Muir | |
| 2019/0210065 A1 | 7/2019 | Rinner et al. | |
| 2020/0269358 A1* | 8/2020 | Yamaguchi | B32B 15/011 |

FOREIGN PATENT DOCUMENTS

| | | |
|---|---|---|
| CN | 104283455 A | 1/2015 |
| DE | 69635870 T2 | 11/2006 |
| DE | 102016116763 A1 | 3/2018 |
| JP | 2012178465 A | 9/2012 |
| WO | 2009055698 A1 | 4/2009 |
| WO | 2014096565 A1 | 6/2014 |

* cited by examiner

MECHANICAL REINFORCING ELEMENT WITH TWO END REGIONS AND TWO ANGULAR REGIONS

This patent application is a national phase filing under section 371 of PCT/EP2020/071690, filed Jul. 31, 2020, which claims the priority of German patent application 102019120720.7, filed Jul. 31, 2019, each of which is incorporated herein by reference in its entirety.

TECHNICAL FIELD

The invention relates to a mechanical reinforcing element. The invention further relates to an assembly comprising the mechanical reinforcing element.

BACKGROUND

Virtual keys or buttons displayed on screens or terminals are becoming increasingly important in human-machine interaction. Digitalization and the Internet of Things (IoT), in particular, are promoting and demanding input options on machines that were previously considered inappropriate. Today, it is therefore not uncommon for not only smartphones but even devices such as refrigerators, coffee machines, cars, or ovens to have touch-sensitive screens with virtual buttons.

To improve usability, it is often desirable to offer the user haptic feedback when the virtual keys are pressed to confirm an input. For example, German patent application DE 10 2016 116 763 A1 discloses a device for generating haptic feedback that uses a mechanical reinforcing element to amplify an extension of a piezoelectric actuator.

However, these disclosed mechanical reinforcing elements are expensive and costly to manufacture due to low tolerances and a large number of production steps.

SUMMARY OF THE INVENTION

Embodiments provide a mechanical reinforcing element that is simpler to manufacture and, in addition, is more resource-efficient, cost-effective, and robust is desirable.

Further embodiments provide a mechanical reinforcing element that is robust, saves resources and is easy to manufacture.

A mechanical reinforcing element is described which has two end regions and two angular regions, the end regions being arranged at two opposite end faces of the reinforcing element and the angular regions each connecting to one of the end regions via a first joint. Further, the angular regions include a stiffening structure. Further, the mechanical reinforcement member has a connecting portion, the connecting portion connecting the two angular regions to each other and connecting to the angular regions via second joints. The mechanical reinforcing element is configured such that when the end regions move relative to each other, the connecting portion performs a movement perpendicular thereto.

The reinforcing element may be configured to deform as a result of a change in expansion or contraction of an expanding or contracting object coupled to the end regions, such as an actuator, such that the connecting portion of the reinforcing element is moved relative to the movement of the end regions in a direction perpendicular thereto. Thus, the direction of movement of the expanding object is redirected to another direction of movement of the connecting portion perpendicular thereto.

A mechanical reinforcing element has the advantage that it can be made in one piece without removing or adding material. Because of the stiffening structure in the angular regions, the mechanical reinforcement element has a stability that can withstand even heavy loads. As a result, the mechanical reinforcement element is durable and can be manufactured easily without wasting resources.

A stiffening structure can include any deformation of the reinforcing element that results in the mechanical reinforcing element becoming more stable, stiff, robust, and strong without adding or removing material. For example, stiffening structure means deformation on the edges by flanging and on the surface by embossing, the direction of the deformation being irrelevant.

The connecting portion may also have a stiffening structure. Thus, the entire mechanical reinforcement element can be made even more stable, since the resistance forces of the mechanical reinforcement element to shear forces and loads of the connecting portion are increased.

Furthermore, the stiffening structure of the angular regions may comprise a bead and/or a fold. Beads are channel-shaped depressions or elevations that can increase the stiffness of a component. Folds are bends or foldings in a workpiece, although it should be noted that they may need to be shortened at joints and angles to allow freedom of joint movement and to prevent the fold from canting. These types of deformation are excellent for increasing the load capacity of the angular regions and thus the potential lifting force of the mechanical reinforcement element.

The stiffening structure of the connecting portion may also have a bead and/or a fold, as these are low-cost manufacturing processes that can increase the stiffness, resilience, and thus the resistance of the mechanical reinforcement element.

At the first and second joints, the mechanical reinforcement element may have no stiffening structure. By not having a stiffening structure at the joints, the mechanical reinforcement element remains flexible and pliable at these areas. Thus, the angles between the different portions of the mechanical reinforcement element can be easily changed, such as when the end regions are moved, without the joint being machined in any way.

The mechanical reinforcement element may be thinned out at the first joints and/or at the second joints. Thus, the flexibility of the reinforcing elements may be increased. A mechanical reinforcement element that has both thinning at the joints and stiffening structures can reinforce a motion or force particularly efficiently. The mechanical resistance of the mechanical reinforcement element to deformation is reduced by the thinnings, while existing stiffening structures can maintain the load capacity. The thinnings may be as an area where the mechanical reinforcement element is thinner, i.e., has a smaller vertical extent or thickness than in the remaining area. Preferably, a thinning has a depth or vertical extent of less than or equal to 400 µm, preferably 300 µm. The maximum thickness of the mechanical reinforcement element is preferably 600 µm. At the point of thinning, the respective reinforcing element thus has a residual thickness of about 200 µm to 300 µm.

The thinning can be formed, for example, by a round or angular indentation. The angular indentation can be square or triangular, for example. The thinning of the joint may be formed on an upper surface and/or a lower surface of the mechanical reinforcement element. In an advantageous embodiment, the thinnings at the first joints are on a lower surface and the thinnings at the second joints are on an upper surface of the reinforcing element. The joint may be thinned into a surface of the mechanical reinforcing element by stamping or milling.

Further, the mechanical reinforcement element may comprise a metal sheet. Metal sheets are thin metal products that make an excellent base for a mechanical reinforcement element. As a metal, the material has a certain hardness that the mechanical reinforcement element needs in applications. In addition, a blank can be easily stamped out of a metal sheet. In addition, stiffening structures, such as beads and folds, can be easily implemented in the manufacturing process for the mechanical reinforcement element.

The metal sheet may have a thickness that is less than 600 µm and preferably less than 400 µm. If the starting material for the mechanical reinforcement element is too thick, the mechanical reinforcement element will be too stiff, at least at the joints, so that the joint cannot bend. However, if the thickness of the reinforcing element at the joints becomes too thin, the reinforcing element at the joints can easily fatigue and eventually break due to high alternating stress. Thicknesses of less than 600 µm and preferably somewhat less than 400 µm have proven to be advantageous in order to simultaneously ensure the required flexibility and the required stability, especially at the joints.

Moreover, the mechanical reinforcement element can have an equal thickness of the metal sheet in the joints, the end regions, the angular regions and the connecting portion. Thus, there is no need to remove material, for example at the joints, or to add material, for example at areas of the mechanical reinforcement element to be reinforced.

The mechanical reinforcement element may comprise titanium. Titanium as a material base for the mechanical reinforcement element is suitable primarily because of two properties. First, titanium is very hard and durable. Therefore, titanium can withstand the constant alternating stress to which a mechanical reinforcement element is subjected, especially at the joints, without breaking. Secondly, titanium has an extremely low coefficient of expansion for a metal, at $8.6 \cdot 10^{-6}$ $K^{-1}$. The mechanical reinforcement element is designed to be connected to a moving body, primarily a piezoelectric actuator made of a ceramic. To make this connection also temperature resistant, the coefficient of expansion from the mechanical reinforcement element and the piezoelectric ceramic should be as similar as possible. Since a ceramic has a very small coefficient of expansion, it is advantageous to select a metal with an equally small coefficient of expansion, such as titanium. Other advantageous materials may include cemented carbide or stainless steel.

Further, the mechanical reinforcement element may have a length that is at least 3 times, and preferably at least 10 times, a width of the mechanical reinforcement element. By being elongated or strip-shaped, the mechanical reinforcement element is also suitable for use in applications with a narrow environment, such as a cell phone.

Preferably, the length of the mechanical reinforcing element is less than 100 mm and more than 10 mm. A length of only 10 mm allows the mechanical reinforcing element to be used in small applications where space is extremely limited. Since the mechanical reinforcing element is usually coupled to a piezoelectric actuator, the mechanical reinforcing element should not be longer than 100 mm, since piezoelectric actuators usually do not exceed a length of 100 mm due to manufacturing difficulties.

In addition, an angle between the end region and the angular region may be less than 45° and preferably less than 20°. The amount of movement of the connecting portion or the stroke in the perpendicular direction, apart from the amount of movement of the end regions relative to each other and a length of the angular region, strongly depends on the angle between the end region and the angular region. If the angle is smaller than 45°, the horizontal movement is well converted into a vertical movement. If the angle between the end region and the angular region is smaller than 20°, the motion is converted even more advantageously.

In addition, the stiffening structure on the mechanical reinforcement element may be configured to fix or lock the mechanical reinforcement element. In practice, the mechanical reinforcing element will mostly be arranged in a housing. The stiffening structure, which may be realized from unevenness and deformations in the connection or angular region, may be configured to fix the mechanical reinforcement element. For example, the stiffening structure can have troughs that can be placed directly onto an elevation on a housing via a plug-in system to secure or lock it in place.

Further, the end regions may have lateral lugs designed to serve as a mounting and fastening aid for the mechanical reinforcing element. The end regions are adapted to be coupled to a moving object. Since both the mechanical reinforcement element and the moving object can be extremely delicate, lugs on the end regions are recommended to facilitate assembly.

At least one mechanical reinforcing element can be coupled to a piezoelectric actuator in a preferred assembly, wherein the end regions are connected to the piezoelectric actuator and are configured and arranged such that when the piezoelectric actuator changes in extension, there is a relative movement of the end regions with respect to each other and a movement of the connecting portion perpendicular thereto. With this assembly, a movement of the piezoelectric actuator between the end regions can be converted into a movement perpendicular thereto and significantly amplified in its expression.

The piezoelectric actuator may have a plurality of piezoelectric layers, and inner electrodes may be disposed between piezoelectric layers. Piezoelectric layers and inner electrodes may be arranged on top of each other to form a stack. Preferably, the stack height is less than 3 mm. The reinforcing elements may be arranged in a stacking direction of the piezoelectric layers on a top side and a bottom side of the piezoelectric actuator. The piezoelectric actuator may be configured and arranged to change its expansion between the end regions upon application of an electrical voltage. Preferably, the expansion occurs transversely to the stacking direction of the piezoelectric layers when an electrical voltage is applied.

The assembly with the mechanical reinforcing element and the piezoelectric actuator may be designed to generate a haptic feedback in displays, buttons, switches or other electronic devices and interfaces. The assembly may serve as a driver for haptic feedback. The assembly may be adapted to generate a haptic feedback for electronic devices, such as touch-sensitive screens. For example, the device shall be adapted to cause an offset of a screen parallel to a screen surface. The assembly provides a simple, inexpensive, space-saving and efficient actuator that can be used to achieve haptic feedback for the user.

BRIEF DESCRIPTION OF THE DRAWINGS

The drawings described below are not to be construed as being to scale. Rather, individual dimensions may be enlarged, reduced or even distorted for better representation.

Elements that are similar to one another or that perform the same function are designated with the same reference signs.

DETAILED DESCRIPTION OF ILLUSTRATIVE EMBODIMENTS

Figure 1:
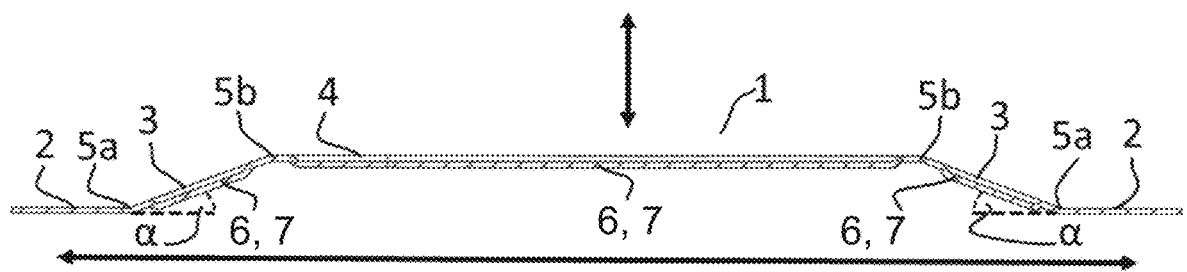
FIG. 1 shows a cross-sectional view of a first embodiment of a mechanical reinforcing element.

FIG. 1 shows a cross-sectional view of a first embodiment of a mechanical reinforcing element 1. The mechanical reinforcement element 1 has two end regions 2 and two angular regions 3. The end regions 2 of the mechanical reinforcement element 1 are located at the two opposite end faces, and the angular regions 3 are each connected to one of the end regions 2 via a first joint 5a. The angular regions 3 have a stiffening structure 6, which is not clearly visible in FIG. 1. A connecting region 4 connects the two angular regions 3 to one another and is connected to the angular regions 3 via second joints 5b, the angular region 3 also having a stiffening structure 6 which is not clearly visible in FIG. 1.

The reinforcing element 1 is designed to deform as a result of a change in an extension, horizontal in FIG. 1, of an object coupled to the end regions 2, for example an actuator, in such a way that the connecting region 4 of the reinforcing element 1 is moved relative to the movement of the end regions 2 in a direction perpendicular thereto. Thus, the, in FIG. 1, horizontal direction of movement of the expanding object is redirected into another, in FIG. 1, perpendicular direction of movement of the connecting portion 4.

An angle α between end region 2 and angular region 3, apart from the amount of movement of the end regions 2 relative to each other and the length of angular region 3, is decisive for the achievable deflection of connecting region 4. If the angle α were 90°, there would be virtually no deflection of connecting region 4 due to the geometry despite movement of end regions 2. If the angle α is smaller than 45°, the horizontal movement is already effectively converted into a vertical movement. If the angle α between end region 2 and angular region 3 is smaller than, or as in FIG. 1, 20°, the horizontal movement of the end regions 2 is converted particularly effectively into a vertical movement of the connecting region 4.

Figure 2:
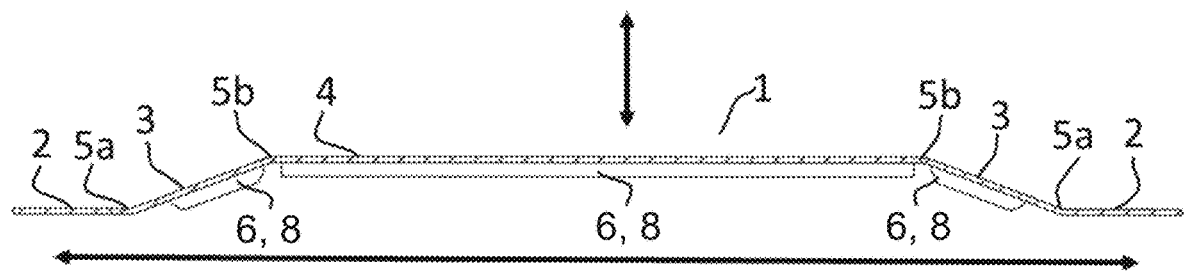
FIG. 2 shows a cross-sectional view of a second embodiment of a mechanical reinforcing element.

In FIG. 2, a cross-sectional view of a second embodiment of a mechanical reinforcing element 1 is shown. Also in this embodiment example, end regions 2 are arranged at the two end faces of the mechanical reinforcement element 1, which in turn are connected to an angular region 3 via first joints 5a. The two angular regions 3 are coupled to each other via second joints 5b and via the connecting region 4.

Figure 3:
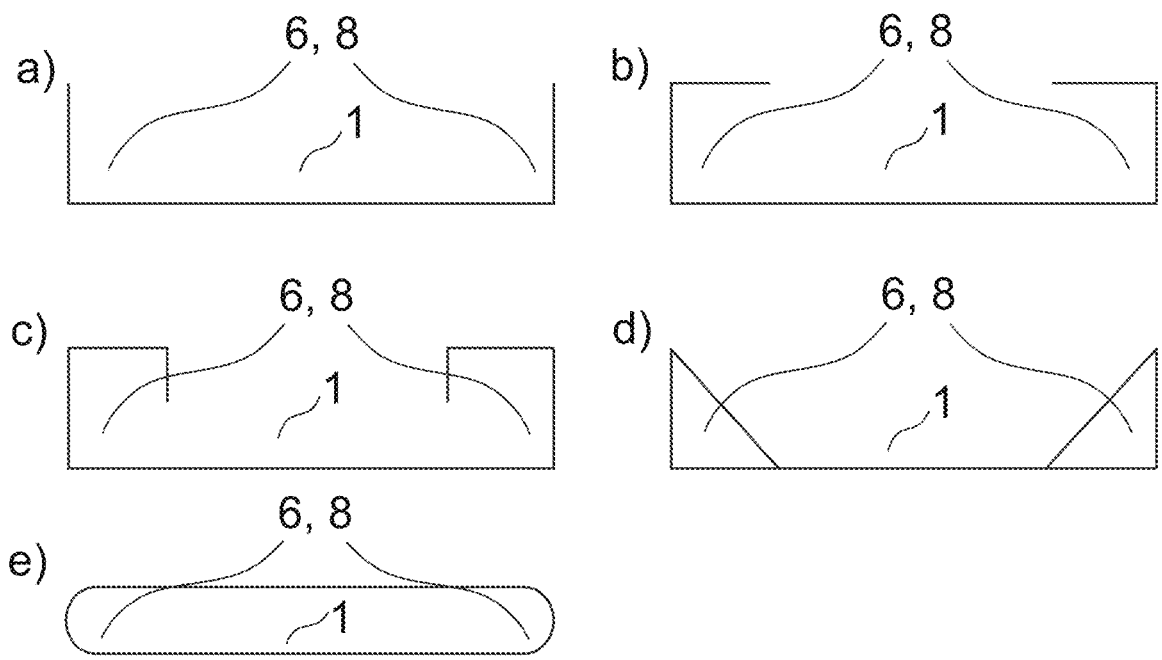
FIG. 3a-e shows a cross-sectional view of five different folds.

In the second embodiment example, the stiffening structures 6 at the angular and connecting regions 4 are implemented via folds 8, in the second embodiment example by simply folding off the edges. However, folds 8 as stiffening structures 6 can be realized with a wide variety of shapes and geometries. The fold 8 can be formed by a deformation, for example a flanging, of the edges of the mechanical reinforcing element 1. For example, it can have a single crease or multiple creases, or it can be rounded. FIG. 3a-e shows five ways in which a fold 8 can be accomplished. For example, the edges can be folded only once as in FIG. 2 and FIG. 3a, twice as in FIG. 3b, or three times as in FIG. 3c. Or the edges can be crimped into a triangle as in FIG. 3d. Furthermore, the fold 8 can also be accomplished by rounded folds as shown in FIG. 3e.

Figure 4:
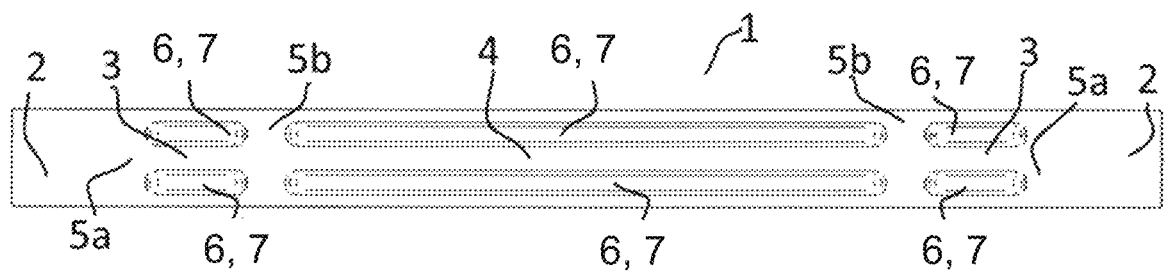
FIG. 4 shows a top view of a first embodiment of a mechanical reinforcing element.

FIG. 4 shows a top view of the first embodiment of a mechanical reinforcement element 1. Both the two angular regions 3 and the connecting portion 4 are each provided with two elongated beads 7 as a stiffening structure 6. The beads 7 may be, for example, rounded or angular depressions as shown in FIG. 5a and FIG. 5b, respectively. A stiffening structure 6 has been omitted at the joints 5a, 5b in order to leave the mechanical reinforcement element 1 flexible and pliable at the joints 5a, 5b.

It is essential to provide the angular regions 3 with a stiffening structure 6, since when the connecting portion 4 is deflected vertically, the angular region 3 must withstand the greatest load. It may be advantageous to also provide the connecting area 4 with a stiffening structure 6, as this may increase the stiffness, load capacity and thus the resistance of the entire mechanical reinforcement element 1.

Figure 5:
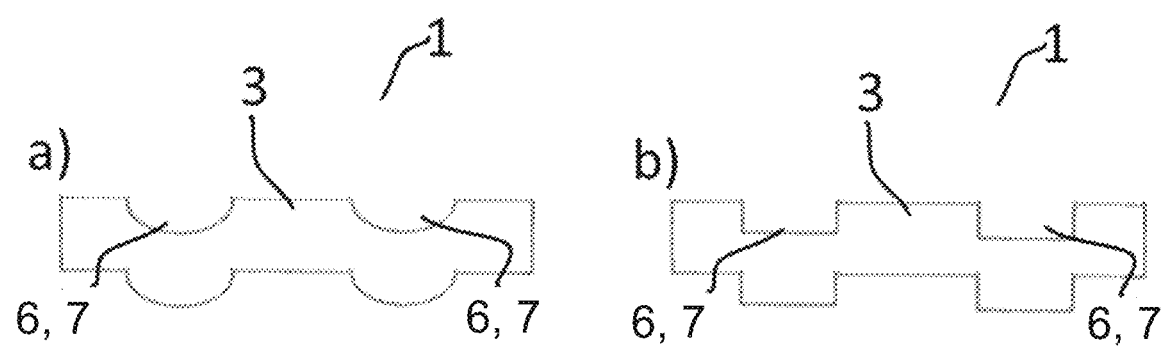
FIG. 5a-b shows the cross-section of two different beads.

In addition, the stiffening structure 6, which may be realized from unevennesses and deformations in the connecting portion 4 or angular region 3, may be configured for fixing the mechanical reinforcement element 1. For example, the stiffening structure 6 can have depressions and elevations as shown in FIG. 5. These can be placed on a matching recess or elevation on a housing by means of a plug-in system, and the mechanical reinforcement element 1 can thus be directly attached.

Although the length of the mechanical reinforcement element 1 in FIG. 4 is 50 mm, it is preferably shorter than 100 mm and longer than 10 mm. In this embodiment, 50 mm was chosen as the length because the application provided sufficient space. A length of, for example, 10 mm allows the mechanical reinforcing element 1 to be used in the smallest of applications where space is extremely limited. Meanwhile, lengths longer than 100 mm are not very relevant, since most piezoelectric actuators 10 are shorter. It is advantageous to design the mechanical reinforcing element 1 such that the length is at least 3 times, and preferably at least 10 times, a width of the mechanical reinforcing element 1. These ratios allow the mechanical reinforcement element 1 to be installed even in narrow applications such as cell phones.

Figure 6:
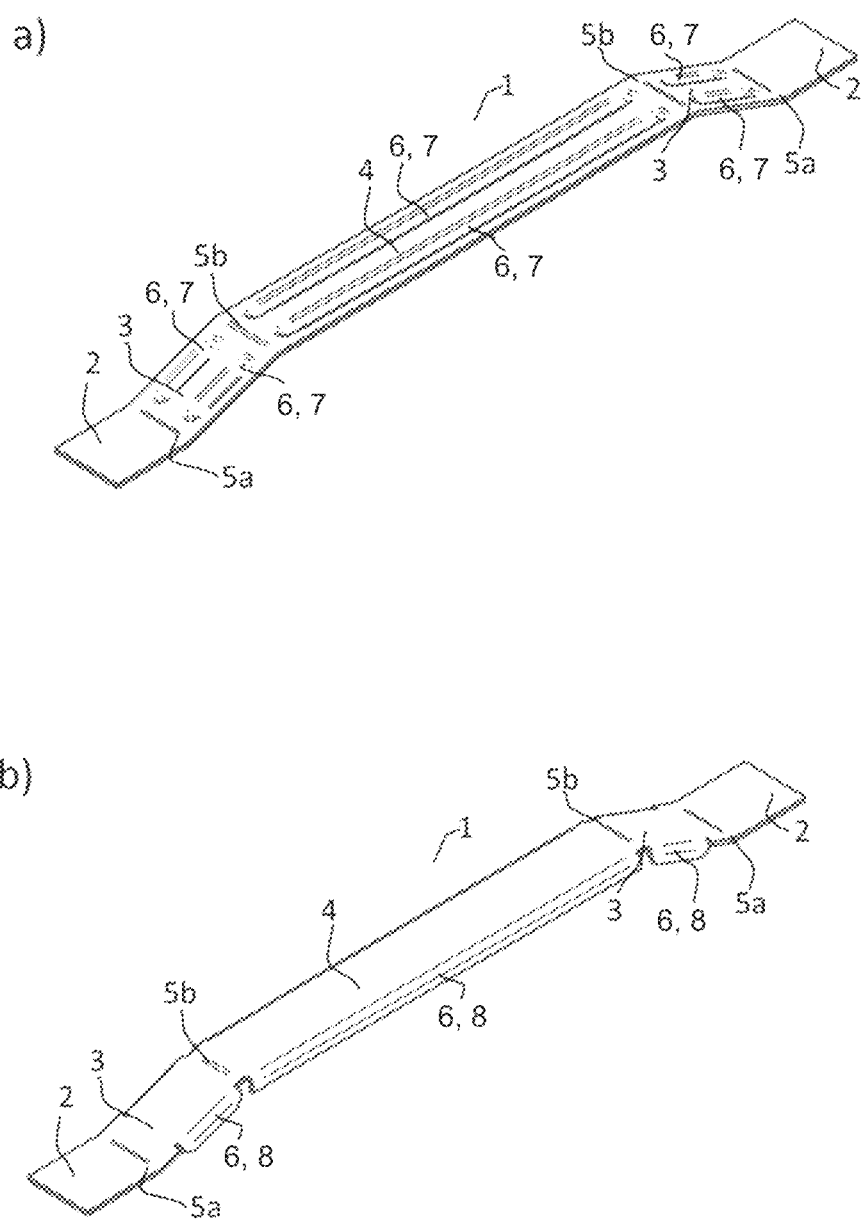
FIG. 6a-b shows a perspective view of a first and second embodiment of a mechanical reinforcement element. respectively.

FIG. 6a and FIG. 6b each show a perspective view of a first and second embodiment example, respectively, of a mechanical reinforcing element 1. The difference between the two embodiments lies in the realization of the stiffening structure 6, which in the first embodiment is realized by means of beads 7 and in the second embodiment by means of folds 8. In both embodiments, a stiffening structure 6 was omitted at the joints 5a, 5b in order to leave the mechanical reinforcement element 1 flexible and pliable at the joints 5a, 5b.

The mechanical reinforcement elements 1 were manufactured in one piece from a metal sheet. Therefore, the reinforcing elements 1 have an equal thickness of the metal sheet in the joints 5a, 5b, the end regions 2, the angular regions 3 and the connecting portion 4. Accordingly, there is no need to remove material, for example at the joints 5a, 5b, and no need to add material, for example at areas of the mechanical reinforcing element 1 to be reinforced. The embodiments have a thickness of 300 µm. If the mechanical reinforcement element 1 is made too thick, the joints 5a, 5b, without thinning 11 at these areas, may become too stiff, so that the function of the mechanical reinforcement element 1 is hindered. However, if the material is chosen too thin, the reinforcing element 1 at the joints 5a, 5b may easily fatigue and eventually break due to high alternating stress. A thickness of less than 600 µm and preferably somewhat less than 400 µm has proven to be advantageous in order to simultaneously ensure the required pliability and the required stability, especially at the joints 5a, 5b.

As a metal, a metal sheet has a certain hardness as well as flexibility, which the mechanical reinforcement element 1 requires. Moreover, the basic shape of the mechanical reinforcement element 1 can be easily stamped from a metal sheet using proven means. On top of that, processes for manufacturing stiffening structures 6, such as beads 7 and folds 8, are regularly used in the processing of metal sheets and can thus be directly used in the manufacturing process for the mechanical reinforcement element 1.

A mechanical reinforcing element 1 has the advantage that it can be manufactured in one piece without having to remove or add material. Due to the stiffening structure 6 in the angular regions 3, the mechanical reinforcement element 1 has a stability that can withstand even heavy loads. Thus, the mechanical reinforcement element 1 is hard-wearing and can be manufactured easily and in a resource-saving manner.

Figure 7:
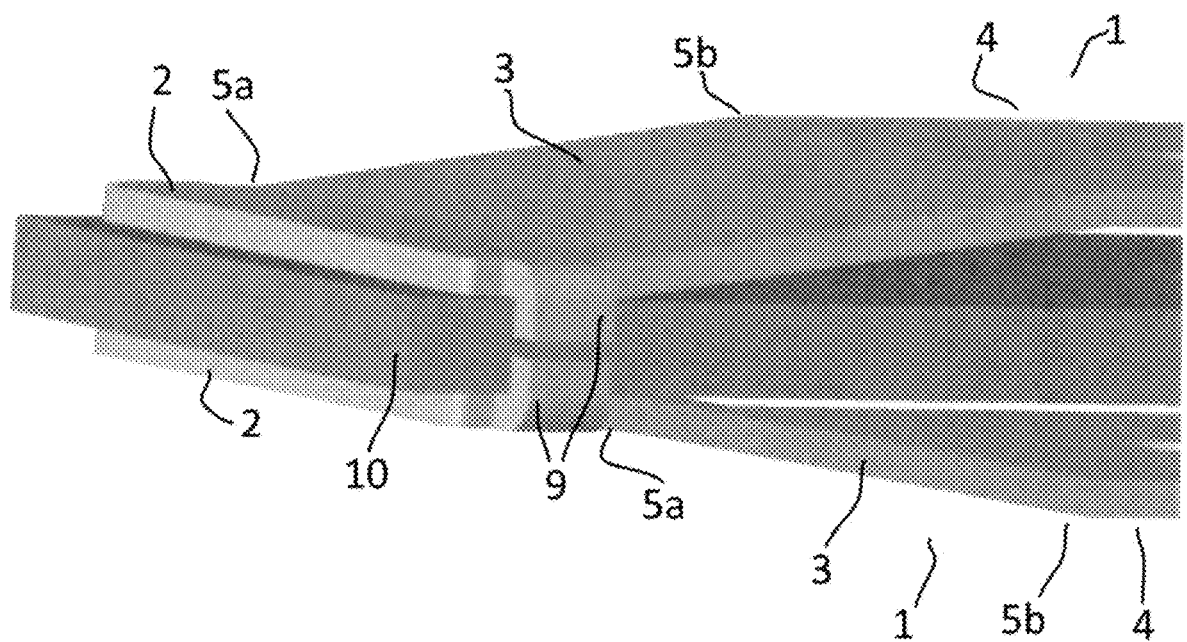
FIG. 7 shows a perspective detail view of an assembly with a piezoelectric actuator and two mechanical reinforcing elements.

In FIG. 7, a perspective detail view of an assembly comprising a piezoelectric actuator 10 and two mechanical reinforcement elements 1 is shown, wherein the mechanical reinforcement elements 1 are respectively arranged on an upper side and a lower side of the piezoelectric actuator 10. By using two mechanical reinforcing elements 1 simultaneously on a piezoelectric actuator 10, the deflection of the whole assembly can be doubled.

The end regions 2 are bonded to the piezoelectric actuator 10 via the bearing surfaces. In addition, the end regions 2 have lateral lugs 9 that serve as mounting and fastening aids. Due to the sensitivity of the mechanical reinforcing element 1, the lateral lugs 9 on the end regions 2 are very useful for assembly.

When the piezoelectric actuator 10 changes its extension due to an applied voltage, as shortens in a horizontal direction, for example, the fixed end regions 2 are pushed horizontally toward each other, and a movement of the connecting portion 4 perpendicular thereto occurs. With this assembly, a movement of the piezoelectric actuator 10 between the end regions 2 can be converted into a movement perpendicular thereto.

The piezoelectric actuator 10 is preferably a multilayer component having a plurality of piezoelectric layers, with inner electrodes disposed between piezoelectric layers. Piezoelectric layers and inner electrodes may be arranged on top of each other to form a stack, with the layers parallel to the end regions 2. Preferably, the stack height is less than or equal to 3 mm. The expansion or contraction of the piezoelectric actuator 10 when an electrical voltage is applied occurs transversely to the stacking direction of the piezoelectric layers and thus between the end regions 2.

Figure 8:
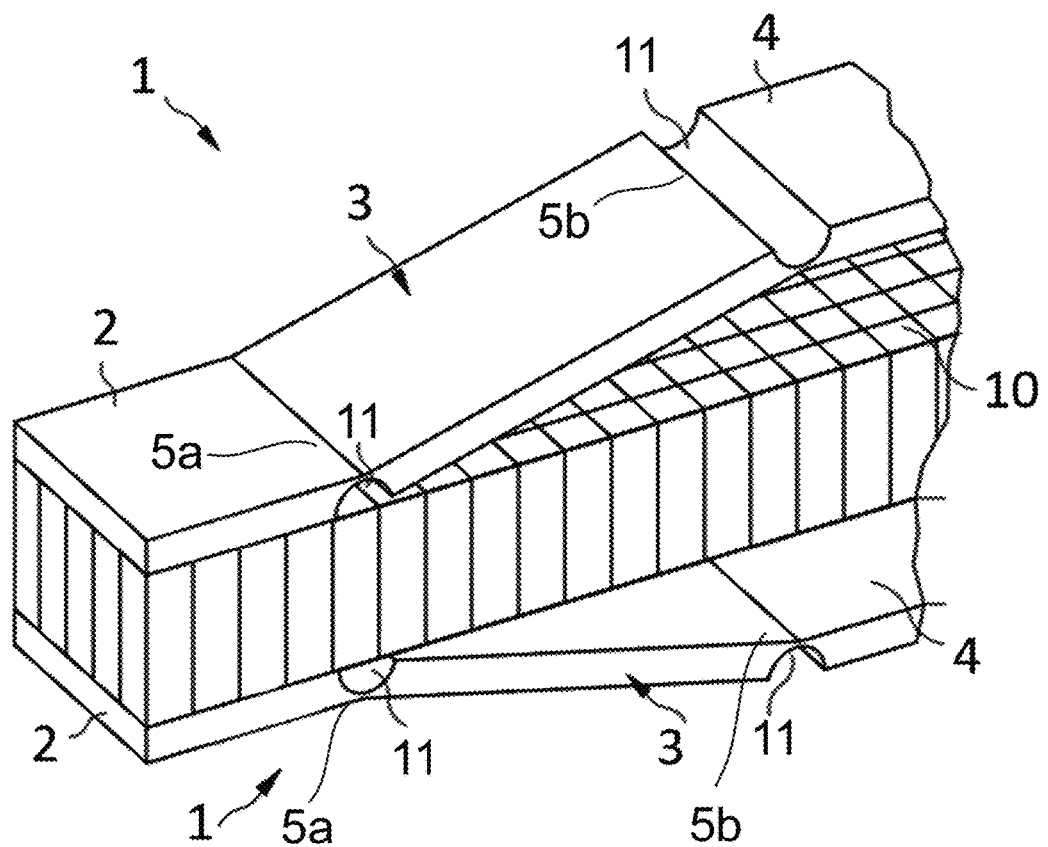
FIG. 8 shows a perspective detail view of an assembly with a piezoelectric actuator and two mechanical reinforcing elements, in which the joints are thinned out.

FIG. 8 also shows a perspective detail view of an assembly comprising a piezoelectric actuator 10 and two mechanical reinforcing elements 1, wherein in this embodiment the first and second joints 5a, 5b are thinned. In the example shown, the thinnings 11 are semi-circular indentations formed in a surface of the reinforcing element. The thinnings 11 at the first joints 5a are on a side of the reinforcing element 1 facing the actuator 10. At the second joints 5b, the thinnings 11 are on the opposite side facing away from the actuator 10. It is also possible to form the thinning 11 at the first and second joints 5a, 5b on the same side of the reinforcing element 1.

The thinning 11 need not be semi-circular, as in FIG. 8, but may have any other shape, the shape of the thinning 11 having an effect on the flexibility and mechanical resistance of the reinforcing element 1. In a particularly advantageous embodiment, the reinforcing element 1 has both thinnings 11 at the joints 5a, 5b and stiffening structures 6, which are not shown in FIG. 8. The combination of the stiffening structures 6 with the thinnings 11 at the first, the second or both joints 5a, 5b makes it possible to provide an efficient reinforcing element 1 that combines the advantages of the increased flexibility provided by the thinned joints 5a, 5b with the increased stability provided by the stiffening structures 6.

The assembly with two mechanical reinforcing elements 1 and the piezoelectric actuator 10, as shown in FIGS. 7 and 8, is suitable for generating haptic feedback as an actuator in displays, buttons, switches or other electronic devices and interfaces. The assembly may be adapted to generate haptic feedback for electronic devices, such as touch-sensitive displays. The assembly provides a simple, inexpensive, space-saving and efficient actuator that can be used to achieve haptic feedback for the user.

The invention is not limited by the description based on the embodiments. Rather, the invention encompasses any new feature as well as any combination of features which in particular includes any combination of features in the claims, even if this feature or combination itself is not explicitly stated in the claims or embodiments.

The invention claimed is:

1. A mechanical reinforcing element comprising:
   two end regions;
   two angular regions, wherein the two end regions are located at two opposite end faces of the mechanical reinforcing element, wherein each angular region connects to one of the two end regions via a first joint, and wherein each angular region has a stiffening structure; and
   a connecting portion interconnecting the two angular regions and connecting to the two angular regions through second joints,
   wherein the mechanical reinforcing element is configured such that, upon a relative movement of the two end regions with respect to each other, the connecting portion performs a movement perpendicular thereto,
   wherein the stiffening structure comprises a bead and/or a fold,
   wherein the bead and/or the fold extends perpendicular to a main expansion direction of the mechanical reinforcing element, and
   wherein the bead and/or the fold expands or is bent in an inward direction.

2. The mechanical reinforcing element according to claim 1, wherein the connecting portion comprises a stiffening structure.

3. The mechanical reinforcing element according to claim 2, wherein the stiffening structure of the connecting portion comprises a bead and/or a fold.

4. The mechanical reinforcing element according to claim 1, wherein the mechanical reinforcing element does not comprise a stiffening structure at the first and second joints.

5. The mechanical reinforcing element according to claim 1, wherein the mechanical reinforcing element comprises thinnings at the first joints and/or at the second joints.

6. The mechanical reinforcing element according to claim 5, wherein a thinning comprises a round or an angular indentation.

7. The mechanical reinforcing element according to claim 1, further comprising a metal sheet.

8. The mechanical reinforcing element according to claim 7, wherein the metal sheet has a thickness that is equal to or less than 600 μm.

9. The mechanical reinforcing element according to claim 7, wherein the metal sheet has the same thickness in the first and second joints, the two end regions, the two angular regions and the connecting portion.

10. The mechanical reinforcing element according to claim 1, wherein the mechanical reinforcing element comprises titanium.

11. The mechanical reinforcing element according to claim 1, wherein a length of the mechanical reinforcing element is at least 3 times a width of the mechanical reinforcing element.

12. The mechanical reinforcing element according to claim 1, wherein a length of the mechanical reinforcing element is less than or equal to 100 mm and equal to or more than 10 mm.

13. The mechanical reinforcing element according to claim 1, wherein an angle between an end region and an angular region is smaller than 45°.

14. The mechanical reinforcing element according to claim 1, wherein the stiffening structure on the mechanical reinforcing element is configured to fix or lock the mechanical reinforcing element.

15. The mechanical reinforcing element according to claim 1, wherein the two end regions comprise lateral lugs configured to serve as mounting and fixing aids for the mechanical reinforcing element.

16. An assembly comprising:
    at least one mechanical reinforcing element according to claim 1; and
    a piezoelectric actuator,
    wherein the two end regions are connected to the piezoelectric actuator and are configured such that, when an extension of the piezoelectric actuator is changed, the two end regions move with respect to each other and the connecting portion moves perpendicular thereto.

17. The assembly according to claim 16, wherein the assembly is configured to generate a haptic feedback at displays, buttons, switches or other electronic devices and interfaces.

18. The assembly according to claim 16, wherein a bead and/or a fold extends spatially in a direction of the piezoelectric actuator.

* * * * *